United States Patent
Chen et al.

(10) Patent No.: US 8,274,910 B2
(45) Date of Patent: Sep. 25, 2012

(54) ADAPTATION PROTOCOLS FOR LOCAL PEER GROUP (LPG) NETWORKS IN DYNAMIC ROADWAY ENVIRONMENTS

(75) Inventors: Wai Chen, Parsippany, NJ (US); Taek-Jin Kwon, Morganville, NJ (US); Ryokichi Onishi, Kanagawa (JP); Rama Vuyyuru, Somerset, NJ (US)

(73) Assignees: Telcordia Technologies, Inc., Piscataway, NJ (US); Toyota Infotechnology Center, U.S.A, Inc., Palo Alto, CA (US)

( * ) Notice: Subject to any disclaimer, the term of this patent is extended or adjusted under 35 U.S.C. 154(b) by 452 days.

(21) Appl. No.: 12/631,235

(22) Filed: Dec. 4, 2009

(65) Prior Publication Data
US 2011/0134762 A1 Jun. 9, 2011

(51) Int. Cl.
H04L 12/26 (2006.01)

(52) U.S. Cl. .......... 370/252; 370/278; 370/315

(58) Field of Classification Search .......... 370/252, 370/278, 315
See application file for complete search history.

(56) References Cited

U.S. PATENT DOCUMENTS

| | | | |
|---|---|---|---|
| 2003/0179742 A1 | 9/2003 | Ogier | |
| 2006/0034298 A1* | 2/2006 | Rosenberg | 370/400 |
| 2007/0001869 A1 | 1/2007 | Hunzinger | |
| 2007/0124063 A1 | 5/2007 | Kindo | |
| 2008/0253306 A1* | 10/2008 | Manion et al. | 370/255 |
| 2009/0067366 A1* | 3/2009 | Aust et al. | 370/328 |
| 2009/0285197 A1 | 11/2009 | Chen et al. | |
| 2009/0285213 A1* | 11/2009 | Chen et al. | 370/392 |
| 2009/0310490 A1* | 12/2009 | Sekine | 370/238 |

OTHER PUBLICATIONS

International Search Report, Jan. 25, 2011 (2 pages).
W. Chen and S. Cai, "Ad Hoc Peer-to-Peer Network Architecture for Vehicle Safety Communication," Communications Magazine, IEEE vol. 43, Issue 4, pp. 100-107, Apr. 2005.
W. Chen, J. Chennikara-Varghese, J. Lee, S. Cai and T. Hikita, "Dynamic Local Peer Group Organizations for Vehicle Communications," 2nd V2VCOM 2006 Workshop co-located with ACM MobiQuitous 2006, pp. 1-8, Jul. 2006.
W. Chen, J. Chennikara-Varghese, T-J Kwon, T. Hikita, and R. Onishi, "Integrated Local Peer Group Organization and Routing," 1st IEEE Workshop on Automotive Networking and Applications (IEEE AutoNet 2006), co-located with IEEE Globecom 2006, pp. 1-8, Dec. 2006.
T-J Kwon, W. Chen, R. Onishi and T. Hikita, "Unicast Routing among Local Peer Group (LPG)-Based VANETs," 3rd IEEE Workshop on Automotive Networking and Applications (IEEE AutoNet 2008), co-located with IEEE Globecom 2008, pp. 1-5, Dec. 2008.

* cited by examiner

*Primary Examiner* — Jason Mattis
(74) *Attorney, Agent, or Firm* — Philip J. Feig

(57) ABSTRACT

A method and system for determining a size of a local peer group (LPG) network in a dynamic roadway (mobile) environment is provided. In one embodiment, the method comprises measuring a roundtrip time between a first node and a second node, and utilizing the measured roundtrip time to select the size of the local peer group network from a lookup table. In another embodiment, the method comprises determining when the roundtrip time exceeds a time interval of the heartbeat signal, and when the roundtrip time exceeds the time interval of the heartbeat signal adjusting the size of the local peer group network.

18 Claims, 8 Drawing Sheets

TOPOLOGY CHANGE AWARENESS

FIG. 3

INITIALIZATION OF TABLE

■ MEASURED HB/MR ROUNDTRIP TIME TABLE

| h/N | 10 | 20 | 30 | 40 | 50 | 60 | 70 | 80 | 90 | 100 |
|---|---|---|---|---|---|---|---|---|---|---|
| 1 | 0.014 | 0.024 | | | 0.055 | | | | | ERR |
| 2 | 0.021 | 0.031 | | | 0.062 | | | | | ERR |
| 3 | | | | | | | | | | |
| 4 | | | | | | | | | | |
| 5 | 0.064 | 0.075 | | | 0.110 | | | | | 0.162 |
| 6 | | | | | | | | | | |
| 7 | | | | | | | | | | |
| 8 | | | | | | | | | | |
| 9 | | | | | | | | | | |
| 10 | 0.136 | 0.157 | | | 0.192 | | | | | 0.251 |

FIG. 4

| H=HOPS | 10 | 20 | 30 | 40 | 50 | 60 | 70 | 80 | 90 | 100 |
|---|---|---|---|---|---|---|---|---|---|---|
| 1 | 0.014 | 0.024 | 0.034 | 0.045 | 0.055 | 0.065 | 0.075 | 0.085 | 0.096 | 0.106 |
| 2 | 0.021 | 0.031 | 0.041 | 0.052 | 0.062 | 0.073 | 0.083 | 0.093 | 0.104 | 0.114 |
| 3 | 0.038 | 0.049 | 0.059 | 0.069 | 0.081 | 0.089 | 0.098 | 0.108 | 0.118 | 0.127 |
| 4 | 0.052 | 0.064 | 0.074 | 0.084 | 0.097 | 0.105 | 0.115 | 0.125 | 0.136 | 0.145 |
| 5 | 0.064 | 0.075 | 0.086 | 0.097 | 0.110 | 0.119 | 0.130 | 0.141 | 0.152 | 0.162 |
| 6 | 0.079 | 0.094 | 0.104 | 0.115 | 0.128 | 0.137 | 0.148 | 0.159 | 0.170 | 0.180 |
| 7 | 0.093 | 0.109 | 0.119 | 0.130 | 0.144 | 0.153 | 0.165 | 0.176 | 0.188 | 0.198 |
| 8 | 0.107 | 0.125 | 0.134 | 0.146 | 0.159 | 0.169 | 0.181 | 0.193 | 0.205 | 0.216 |
| 9 | 0.121 | 0.140 | 0.149 | 0.161 | 0.175 | 0.186 | 0.198 | 0.210 | 0.222 | 0.234 |
| 10 | 0.136 | 0.157 | 0.165 | 0.178 | 0.192 | 0.203 | 0.215 | 0.228 | 0.240 | 0.251 |

N=NODES

LPG SIZE CONTROL
DOWNSIZING HEURISTICS-DECREMENT BY 1

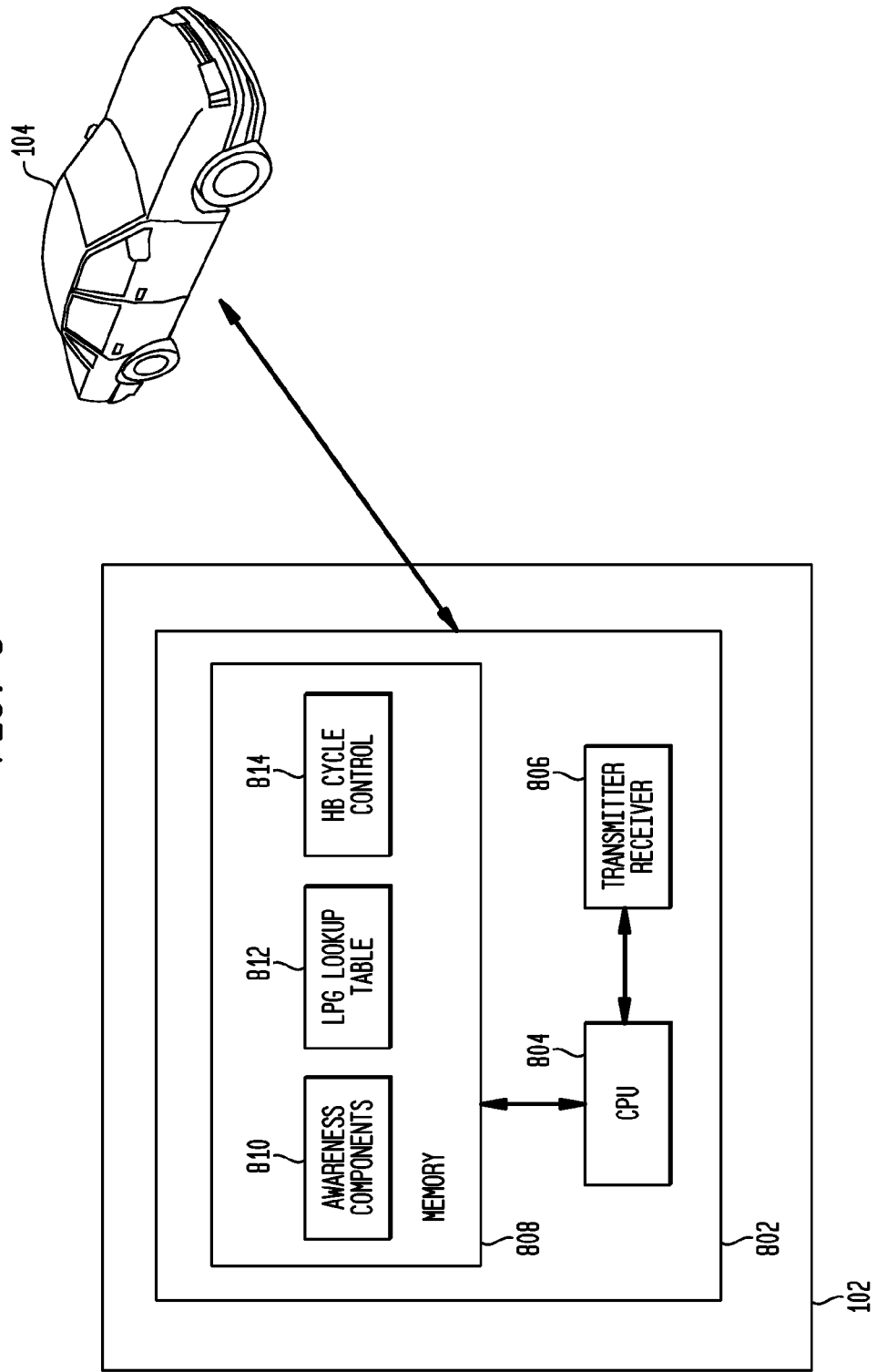

ADAPTATION PROTOCOLS FOR LOCAL PEER GROUP (LPG) NETWORKS IN DYNAMIC ROADWAY ENVIRONMENTS

BACKGROUND

The present invention relates generally to wireless mesh networks, and more particularly to adaptation protocols for mesh networks in dynamic roadway environments.

A wireless mesh network is a communications network made up of radio nodes organized in a mesh topology. In a full mesh topology, each node is connected directly to each of the other nodes. In a partial mesh topology, nodes are connected to only some, not all, of the other nodes. The coverage area of the radio nodes working together as a single network is sometimes known as a mesh cloud. Wireless mesh networks can be implemented via various wireless standards, including 802.11, 802.16, and cellular technologies.

A mesh network provides the advantage of many-to-many connections between nodes, i.e., there is usually more than one possible route for communicating information between nodes. Mesh networks are also capable of dynamically updating and optimizing these connections. As new nodes become available they may be added to the mesh network. Nodes may also be removed from the mesh network. Thus, the topology of a mesh network is dynamic.

The nodes that form a mesh network may be highly mobile. For example, radio nodes may be part of an automobile or another type of motor vehicle that is constantly changing position. These nodes constantly roam (change position) within the mesh network. In addition, the size and topology of a mobile mesh network is constantly changing as nodes move in and out of a coverage area. The topology of a mobile mesh network changes even more frequently than the topology of a stationary mesh network.

Thus, there is a need in the art for protocols that define the topology of a wireless mesh network in a highly dynamic mobile environment.

SUMMARY OF INVENTION

A method and system for determining a size of a local peer group (LPG) network in a dynamic roadway (mobile) environment is provided. In one embodiment, the method comprises measuring a roundtrip time between a first node and a second node, and utilizing the measured roundtrip time to select the size of the local peer group network from a lookup table. In another embodiment, the method comprises determining when the roundtrip time exceeds a time interval of the heartbeat signal, and when the roundtrip time exceeds the time interval of the heartbeat signal adjusting the size of the local peer group network.

In one embodiment, the system comprises a processor operable to measure a roundtrip time between a first node and a second node and utilize the measured roundtrip time to select the size of the local peer group network from a lookup table. In another embodiment, the processor is further operable to determine when the roundtrip time exceeds a time interval of the heartbeat signal, and when the roundtrip time exceeds the time interval of the heartbeat signal adjusting the size of the local peer group network.

A computer readable medium embodying the method is also disclosed.

BRIEF DESCRIPTION OF DRAWINGS

FIG. 3 is an example of a look up table containing measured roundtrip time entries for controlling LPG size;
FIG. 4 is an example of a look up table containing measured roundtrip time entries and estimated roundtrip time entries for controlling LPG size;
FIG. 8 is a computing environment that can benefit from the present invention.

DETAILED DESCRIPTION

A method and system for determining an optimal size of a local peer group (LPG) network in a highly dynamic roadway (mobile) environment is provided. A dynamic roadway (mobile) environment refers to the constant flow of automobiles along streets and highways, as well as the direction of movement by the automobiles. An LPG network refers to a mobile mesh network that provides for wireless communication between automobiles within the network. The automobiles within the network are also known as "nodes", and function in the same manner as nodes within a computer network. The invention is disclosed within the context of automobiles with radio transceivers functioning as the nodes within the LPG network. It is understood, however, that the invention and general concepts may benefit any computer network.

Figure 1:
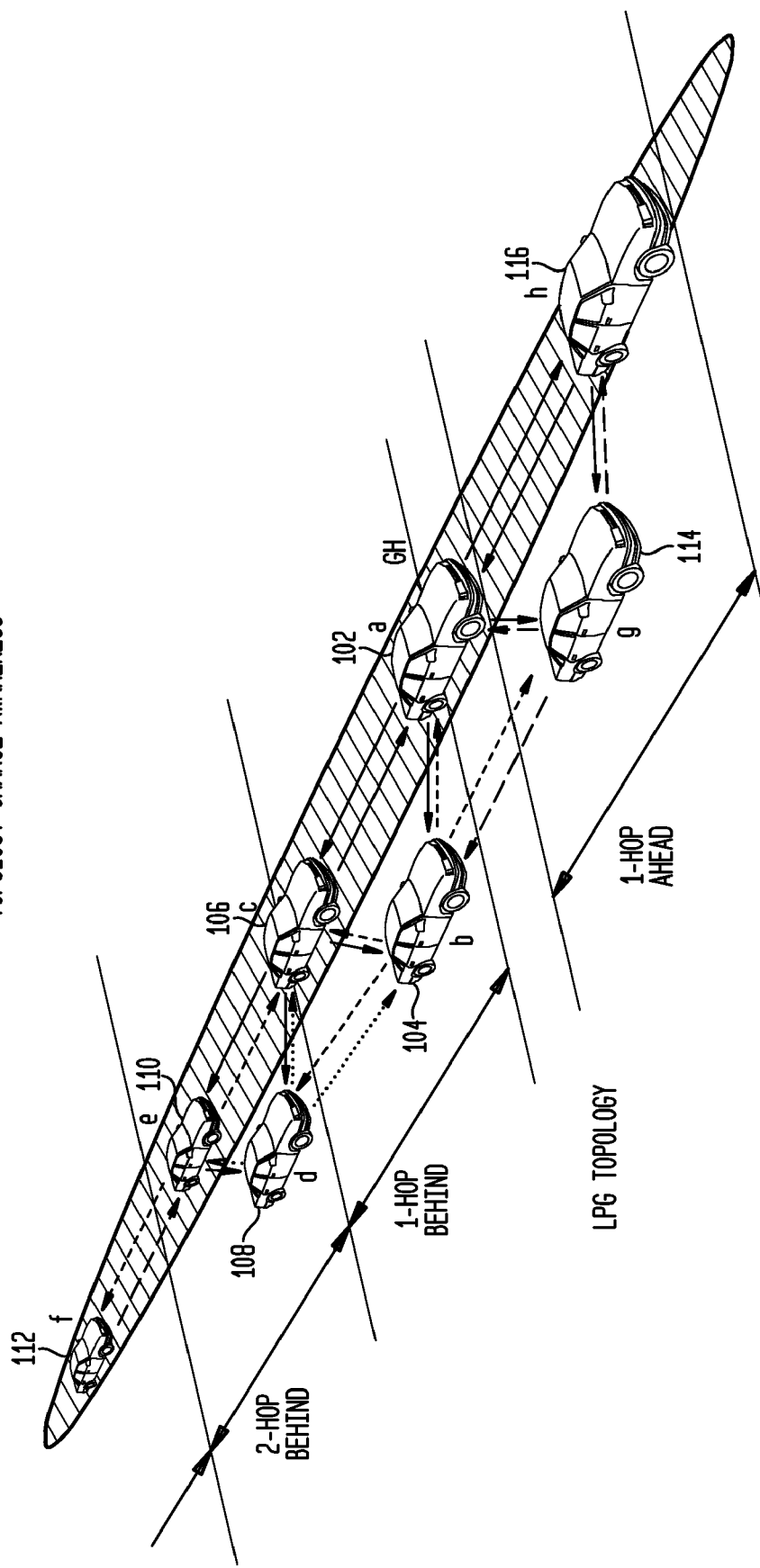
FIG. 1 is an example of a local peer group (LPG) network.

FIG. 1 is an example of a topology of an LPG network. The topology comprises several automobiles (nodes) each having a wireless transceiver linked together to form the LPG network. The wireless transceiver may be part of a larger computer system within each automobile. This computer system is sometimes known as a "dashboard computer". The dashboard computer comprises a memory and a processor and performs specific functions as directed by software stored within the memory. The wireless transceiver, which may be an 802.11 compliant transceiver and enables the automobiles and their respective dashboard computers to communicate with each other.

One of the automobiles 102 within the topology is labeled GH ("Group Header"). The group header is the "head node" within the topology, or the starting point from which the position of all the other automobiles (nodes) are measured. Automobiles 114 and 116 are one hop ahead of automobile (GH) 102. Automobiles 104 and 106 are one hop behind automobile (GH) 102. Automobiles 108 and 110 are two hops behind automobile (GH) 102. Automobile 112 is three hops behind automobile (GH) 102. A hop is defined as the number of connections between nodes required to reach the group header 102. In instances where there is more than one possible path to the group header, the smallest hop count is used to define the relative relationship between the nodes. For example, automobile 106 may communicate directly with the GH 102, or automobile 106 may communicate with the GH 102 via automobile 104. When the automobile 106 communicates directly with the GH 102, the hop count between these two automobiles is 1. When the automobile 106 communicates indirectly with the GH 102 via automobile 104, the hop count between these two automobiles is 2. If the GH 102 is presented with an automobile that has one or more possible hop counts, e.g., automobile 106, the GH 102 defines the relative position of that automobile according to the lowest hop count. Therefore, the relative position between the GH 102 and automobile 106 is defined by a hop count of 1.

Figure 2:
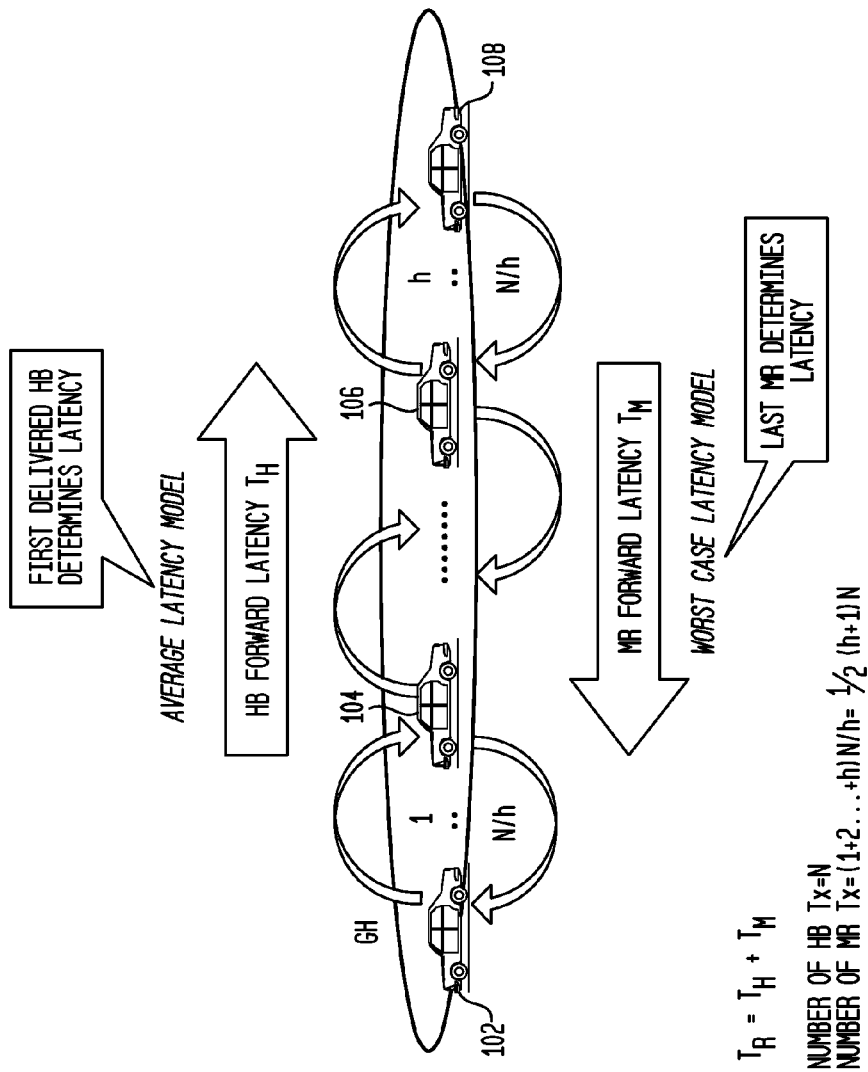
FIG. 2 is a $T_R$ model in accordance with one embodiment of the invention.

FIG. 2 is a $T_R$ model in accordance with one embodiment of the invention. $T_R$ is the total reporting time necessary for a node to respond to a heartbeat message from a GH 102. $T_H$ is the amount of time it takes for the individual automobiles to receive the heartbeat (HB) message from the GH 102. $T_M$ is the amount of time it takes for the individual automobiles to send a message response (MR) to the GH 102. $T_R$ is equal to $T_H$ plus $T_M$. $T_R$ is unique for each automobile. Generally, as the number of hops between an automobile and the GH 102 increases, the time value for $T_R$ also increases.

$T_R$ may also be estimated as follows according to equation 1:

$$T_R = T_H + T_M \quad (1)$$

$$= d + (h-1)\overline{L}_H + \left(2\frac{N}{h} - 1\right)d + \frac{N(h+1)}{2}d'$$

$$= (h-1)\frac{1 - \left(1 + \frac{N}{h}\right)p^{\frac{N}{h}} + \frac{N}{h}p^{\frac{N}{h}+1}}{(1-p)\left(1 - p^{\frac{N}{h}}\right)}d + 2\frac{N}{h}d + \frac{N(h+1)}{2}d'$$

Wherein the above equation, h is the hop count, N is the number of nodes (automobiles), d is the heartbeat transmittal duration, d' is the message response transmittal duration, and p is the probability of error. $L_H$ is the average per-hop HB forward latency, i.e., the average latency for the HB message to travel one hop; due to the random access contention to use the wireless channel, the HB message experiences a random latency to be forwarded at each hop), which is given by equation 2:

$$\overline{L}_H = \frac{(1-p)}{1-p^{\frac{N}{h}}}d + \frac{(1-p)p}{1-p^{\frac{N}{h}}}2d + \frac{(1-p)p^2}{1-p^{\frac{N}{h}}}3d + \ldots + \quad (2)$$

$$\frac{(1-p)p^{\frac{N}{h}-1}}{1-p^{\frac{N}{h}}}\frac{N}{h}d$$

$$= \frac{(1-p)d}{1-p^{\frac{N}{h}}}\left[1 + 2p + 3p^2 + \ldots + \frac{N}{h}p^{\frac{N}{h}-1}\right]$$

$$= \frac{1 - \left(1 + \frac{N}{h}\right)p^{\frac{N}{h}} + \frac{N}{h}p^{\frac{N}{h}+1}}{(1-p)\left(1 - p^{\frac{N}{h}}\right)}d$$

A heartbeat is a periodic signal generated by the GH 102 and transmitted (broadcast) to the other automobiles to determine if these automobiles are still present within the LPG. The GH 102 sends out heartbeat signals at regular intervals. Each automobile that receives the heartbeat signal rebroadcasts the heartbeat signal throughout the LPG. For example, as shown in FIG. 2, GH 102 broadcasts the heartbeat signal to automobile 104; automobile 104 then rebroadcasts the heartbeat signal to automobile 106. An automobile may remove itself from the LPG by roaming (driving) beyond the range of the heartbeat signal broadcast by GH 102 or by a driver turning off the automobile (which would also turn off the transceiver that receives the heartbeat signal). Automobiles may be added or removed to the LPG based upon their relative position (hop count) to the GH 102. Upon receiving a heartbeat message from the GH 102, an automobile responds with a message to the GH 102 acknowledging the heartbeat message. The acknowledgment indicates to the GH 102 that the responding automobile has received the heartbeat signal.

The heartbeat signal is a data packet that includes a "hop count" field. Every time the heartbeat signal is retransmitted, the hop count field is increased by one. If the frequency of the heartbeat signal is too small, then the overhead associated with the heartbeat signal will exceed a threshold limit because the LPG size is updated too frequently. Thus, there is a need for a method to select a heartbeat frequency and an LPG size in an efficient manner that does not over utilize system resources.

FIGS. 3 and 4 together demonstrate how a "lookup table" can be created. The lookup table can be used to select an appropriate LPG size. Each time entry within the lookup tables shown in FIG. 3 and FIG. 4 is given in seconds. FIG. 3 is an incomplete lookup table created from observed (measured) message responses as described below. FIG. 4 is an estimated lookup table based upon FIG. 3. The missing lookup table time entries within FIG. 4 are calculated by a "least squares" approximation that utilizes the measured time entries in the lookup table of FIG. 3. The use of a "least squares" approximation to calculate unknown values is well known in the art.

The estimated time entries within lookup table 400 can be used to select an appropriate LPG size. In one embodiment, the lookup table 400 is created by a simulator within the GH 102. The following example utilizes a QUALNET™ 3.8 simulator to create the lookup table 400. A GH 102 broadcasts a heartbeat signal every 1000 milliseconds (1 second). The heartbeat signal is broadcast in compliance with an 802.11a standard, at a data rate of 6 Mbps with an expected range of approximately 100 meters. It is assumed that an automobile, e.g., automobile 104, receives the heartbeat signal within 300 milliseconds of the broadcast and responds with a message response (MR) including a node identifier and a hop count. There may be instances where the automobile 104 cannot communicate with the GH 102 because the communication channel is unavailable or blocked. In these instances, the automobile 104 waits 10 milliseconds, as a back off time period, and then attempts to communicate the MR to the GH 102.

Once the MR is communicated from the automobile 104 to the GH 102, the roundtrip time, $T_R$, is calculated as discussed above and used to populate lookup table 400. For example, a GH 102 broadcasts a heartbeat signal to an automobile 104 and the automobile 104 sends an acknowledgment, i.e., a message response back to the GH 102. Further assume, for purposes of this example, that the automobile 104 is one hop away from the GH 102 and that roundtrip time is 0.014 seconds. Also assume that a second automobile 108 is two hops away from the GH 102 and returns a message response with a roundtrip time of 0.021 seconds. A third automobile 106 is only one hop away, but returns a message response with a roundtrip time of 0.024 seconds. These roundtrip times are used to populate lookup table 300. Each roundtrip time is added to the lookup table 300 and associated with the appropriate number of hops. As the number of hops increases from 1 to 10, the roundtrip time also increases. An automobile may also be connected to the GH 102 by the same number of hops, but have a different roundtrip time. For example, automobiles 104 and 106 are both one hop away from the GH 102, but the roundtrip time associated with automobile 104 is less than the roundtrip time associated with automobile 106. The roundtrip times associated with a hop count increase from the smallest value to the greatest value moving from left to right across the lookup table 300.

Estimated values for each missing table entry are calculated from the measured values in lookup table 300 utilizing the "least squares" approximation method. The use of approximation allows each entry in lookup table 400 to be completed. Lookup table 400 may then be used to select an appropriate LPG size.

In one embodiment, an LPG size is selected based upon a maximum $T_R$ value of 100 milliseconds (0.1 seconds). The $T_R$ value ensures the data passed between the automobile 104 and the GH 102 is "fresh" and relevant. Freshness is important in a dynamic roadway environment because it is desirable the GH 102 utilize only the most current data. An appropriate LPG size is selected from the lookup table 400 by selecting an LPG size associated with a time value less than 0.1 seconds and also constrained by the maximum number of hop counts. For example, if the maximum number of hop counts is set to five, then the selected LPG size is forty. Forty is the selected LPG size because it corresponds to an entry on the lookup table 400 with a maximum value that does not exceed 0.1, i.e., 0.097 and the maximum number of hop counts. As long as the automobile 104 is within five hop counts of the GH 102, and there are forty or less automobiles within the LPG, the data passed between the automobile 104 and the GH 102 will be received in less than 0.1 seconds.

An important benefit of selecting an optimal LPG size from the lookup table 400 is the reduction in computational overhead associated with mathematically calculating the LPG size. An additional benefit comes from selecting an LPG size that ensures $T_H$ is greater than $T_R$. When $T_R$ is greater than $T_H$, i.e., a second heartbeat signal is transmitted by the GH 102 before the MR is received. Any MRs received in response to the first heartbeat signal but after the second heartbeat signal is transmitted may supply irrelevant or inaccurate information to the GH 102. Therefore, it is important that the MRs received at the GH 102 are in response to a heartbeat signal transmitted during that particular heartbeat cycle.

In one embodiment, the optimal LPG size is always associated with a maximum roundtrip time value less than a threshold value. As a GH 102 moves through the dynamic roadway environment, the topology of the LPG may constantly change as automobiles move in and out of communication range with the GH 102. When the topology changes frequently, the frequency of the heartbeat signal is increased, i.e., the time interval between heartbeat signals is shortened to maintain freshness of the LPG. When the topology does not change, for example, the GH 102 and the surrounding automobiles are stopped at a red light or stalled in traffic, the frequency of the heartbeat signal is decreased, i.e., the time interval between heartbeat signals is lengthened.

Figure 5:
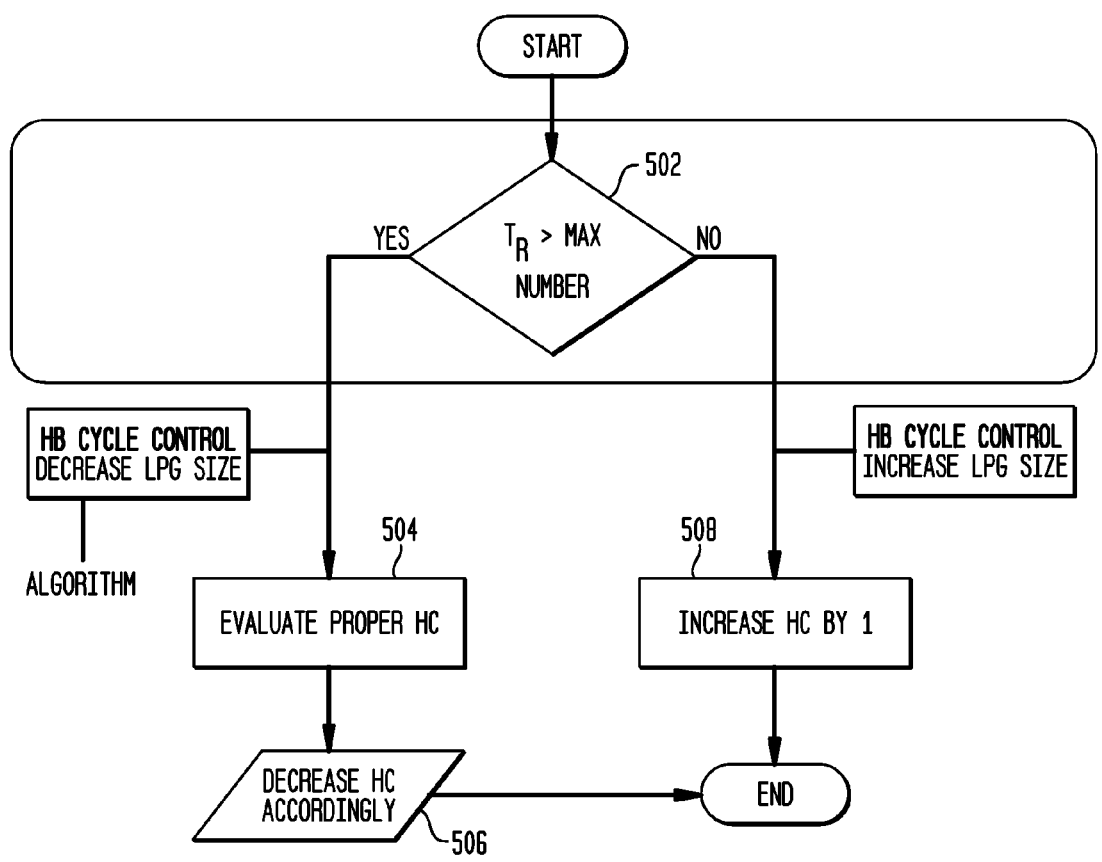
FIG. 5 is an example of a look up table for controlling LPG size.
Figure 6:
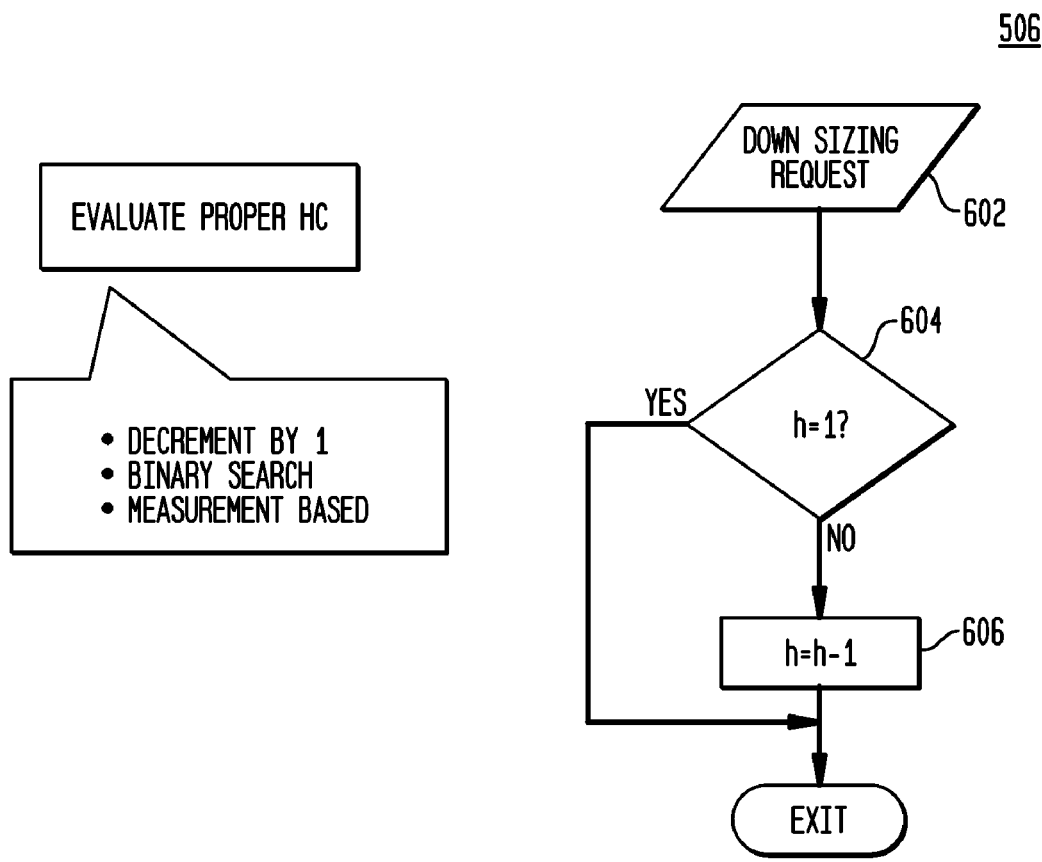
FIG. 6 is a flow diagram of a method for decreasing LPG size by one.
Figure 7:
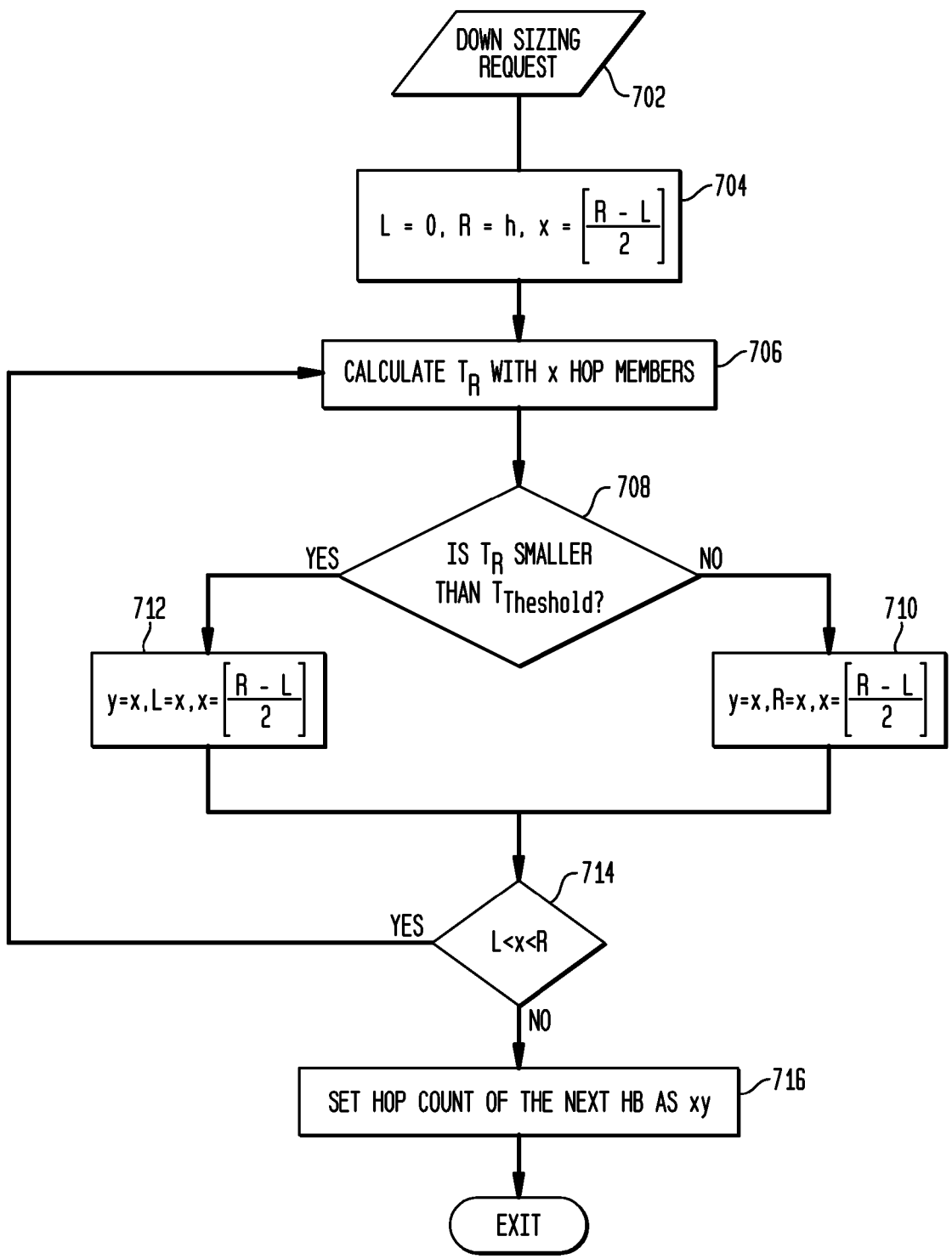
FIG. 7 is a flow diagram of an alternative method for decreasing LPG size.

FIGS. 5, 6 and 7 collectively disclose a method for determining an optimal LPG size. FIG. 5 is a flow diagram of a method for determining an optimal LPG size. FIG. 6 is a flow diagram of a method for determining an appropriate hop count value that is utilized by the method described by FIG. 5. FIG. 7 is an alternative method for determining an appropriate hop count value that is utilized by the method described by FIG. 5.

The method starts at decision step 501 when a value for roundtrip time is calculated. In one embodiment, the roundtrip time is calculated as discussed above according to equation 1. At decision step 502, a determination is made as to whether a roundtrip time exceeds a heartbeat time interval. If the roundtrip time does not exceed the heartbeat interval then the method proceeds to step 508. The current size of the LPG network as well as the current hop count value is known and stored at the automobile inside the dashboard computer. At step 508, the maximum hop count value is increased by 1. If the roundtrip time does exceed the heartbeat interval, then the method proceeds to step 504.

At step 504, the hop count value is evaluated and decreased by one of three methods. Two of the three methods that can be used to evaluate the hop count at step 504 are illustrated in FIG. 6 and FIG. 7. In the third embodiment (not illustrated), the method utilizes a lookup table, such as one shown in FIG. 4, to select an appropriate hop count value based upon the roundtrip time as discussed above.

In the first embodiment, the hop count value is decreased by a value of 1. Referring to FIG. 6, which is an enlarged view of the process that takes place at step 504, at step 602 a downsizing request associated with the hop count value is received by the dashboard computer. At decision step 604, a determination is made as to whether the hop count value equals 1. If the hop count value equals 1, then the smallest possible hop count value has already been reached and the method ends. If the hop count value is greater than 1, then the method proceeds to step 606. At step 606, the hop count value is decreased by 1. The method illustrated by FIGS. 5 and 6 together may be repeated to determine if an appropriate hop count value has been selected.

In another embodiment, the hop count value is factored, i.e., divided by a number to determine a new hop count value. Referring to FIG. 7, which is an enlarged view of the process that takes place at step 504, at step 702 a downsizing request associated with the hop count value is received by the dashboard computer. In one embodiment, the hop count value is calculated as the midpoint value between the current hop count value and a lower bound value, such as zero. At step 704, a lower bound value is stored in a variable L. In one embodiment, the lower bound value is set to zero. An upper bound value, i.e., the current hop count value (h), is stored in a variable R. The current hop count value (h) is divided by a factor, .e.g., 2, and the computed value is stored in variable x. For example, if the current hop count value is 10, and the value of the factor is 2, then 10 is divided by 2 to compute a value of 5. The value 5 is stored in the variable x. At step 706, the roundtrip time is recalculated based upon the hop count value stored in the variable x. The roundtrip time calculated at step 706 should be less than the roundtrip time calculated at step 501 because the hop count value has decreased.

At decision step 708, a determination is made as to whether the roundtrip time is now smaller than a threshold value, i.e., the heartbeat interval. If the roundtrip time is not smaller than the threshold value, the method proceeds to step 710. At step 710, the current hop count value stored in the variable x is also stored in the variable y. The hop count value stored in x is also restored into the variable R as the value of a new upper bound. Then the hop count value stored in the variable x is factored again. In one embodiment, a new hop count value is calculated according to the equation: $x=[(R-L)/2]$ which provides a new midpoint value between the lower bound and the upper bound. The method then proceeds to decision step 714, where a determination is made as to whether $L<x<R$. If $L<x<R$ is true, then the method proceeds to step 716 and the hop count value is set to the value stored in the variable x. If $L<x<R$ is false, then the method loops back to step 706.

The following example illustrates how a hop count value of 10 may be reset to a hop count value of 3 by the method shown in FIG. 7. The hop count value stored in variable h is also stored in the variable R. R is the upper bound. The lower bound is set to zero and stored in the variable L. A new hop count value is computed as the value of the midpoint between the upper bound and the lower bound according to the equation $x=[(R-L)/2]$. After substituting in the values of the present variables, the equation may be rewritten as $x=[(10-0)/2]=5$. A new roundtrip time is calculated based upon a maximum hop count value of 5. However, a hop count value of 5, in this example, results in a roundtrip time that exceeds a threshold value, i.e., the heartbeat time interval. The current hop count value, 5, is refactored. The current hop count value 5 becomes the new upper bound, and L is still the lower bound. A new midpoint between the upper bound and the lower bound is recalculated. In the present example, the midpoint between the upper bound (R) and the lower bound (L) is calculated according to the equation $x=[(R-L)/2]$. After substituting in the values of the present variables, the equation may be rewritten as $x=[(5-0)/2]=2.5$. In one embodiment, when a non-whole number is computed as a value of a hop count, the number is rounded up. Therefore, 2.5 is rounded up to 3. A determination is then made as to whether the calculated hop count value, e.g., 3, is within the range of the lower bound and the upper bound. In the present example, the hop count value 3 is greater than the lower bound value of 0 and less than the upper bound value of 5. The new hop count value is set to 3 and used to compute a new roundtrip time.

Referring back to decision step 708, if the roundtrip time is smaller than the threshold value, the method proceeds to step 712. At step 712, the value within the variable x is first stored in the variable y. Recall that the variable x stores the computed midpoint value between the upper bound and the lower bound of the original hop count value. The value stored in the variable x is then stored in the variable L. Finally, the value of the variable x is recomputed according to the equation $x=L+[(R-L)/2]$. As an example, assume that at step 704, L is set equal to 0, h is set equal to 10, R is set equal to h, and x is calculated according to the equation $x=[(R-L)/2]$ and found to have a value equal to 5. At step 712, y=5, L=5, and x is recalculated according to the $x=L+[(R-L)/2]$. Substituting in the known values for each of the variables provides the equation $x=5+[(10-5)/2]$ which gives a result $x=7.5$.

The method then proceeds on to step 714. Again, using the results computed in the example from step 712, a determination is made as to whether $L<x<R$ is true. Substituting in the values for L, x, and R from step 712, $5<7.5<10$, which results in a true result, i.e., x lies between the lower bound and the upper bound. In one embodiment, the hop count value is rounded up from 7.5 to 8 because a hop count value must be a whole number. The method then loops back to step 706, and the roundtrip time is calculated based upon the value of x.

FIG. 8 is an example of a computing environment that can benefit from the present invention. In one embodiment, the computing environment comprises a GH 102 wirelessly in communication with another automobile 104. The GH 102 and automobile 104 collectively form an LPG network. A dashboard computer 802 within the GH 102 controls the size of the LPG network and communication between the GH 102 and the automobile 104. It is understood that the automobile 104 has a similar dashboard computer (not shown) capable of receiving and responding to communications received from the GH 102.

The dashboard computer 802 comprises a processor (CPU) 804, a transceiver 806, and a memory 808. The computer 802 is coupled to the transceiver 806 and the memory 808 and executes programs stored in memory such as "HB cycle control" 814 and "awareness components" 810. The transceiver 806 enables wireless (RF) communication between the GH 102 and the automobile 104. In one embodiment, the GH 102 communicates with the automobile 104 via the 802.11a standard. It is understood that the invention may use any wireless communication standard. Other components commonly found within a dashboard computer 802, such as a power source, an antenna, a storage unit, and various support circuitry are understood to be present, but not shown in FIG. 8.

The memory 808 may include random access memory, read only memory, removable disk memory, flash memory, and various combinations of these types of memory. The memory 808 is sometimes referred to as a main memory and may in part be used as cache memory. The memory 808 stores at least the "awareness components" 810, an LPG lookup table 812, and the "HB cycle control" 814. The awareness components 810 store the size of the LPG network and maintain a list of all the vehicles or automobiles within the LPG network. The awareness components 810 may also maintain information associated with each automobile within the LPG network. An example of the LPG lookup table 814 is provided in FIG. 4. The LPG lookup table 814 enables selection of an optimal LPG network size based upon the roundtrip time.

The "HB cycle control" 814 controls the maximum allowable hop count value between the GH 102 and the automobile 104. The function of the "HB cycle control" 814 is described above in regards to FIGS. 5, 6 and 7. In one embodiment, the "HB cycle control" 814 increases the hop count value when the roundtrip time is less than the heartbeat time interval. In another embodiment, the "HB cycle control" 814 decreases the hop count value when the roundtrip time is greater than the heartbeat time interval. Specific methods for decreasing the hop count value are described in regards to FIGS. 6 and 7. The "HB cycle control" 814 may also select an optimal LPG network size by utilizing a lookup table such as the one shown in FIG. 4.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A computer implemented method for determining a size of a local peer group network, comprising:
   measuring a roundtrip time between a first node and a second node;
   utilizing the measured roundtrip time to select the size of the local peer group network from a lookup table, wherein the computer performs one or more steps of measuring and utilizing;
   transmitting a heartbeat signal from the first node to the second node;
   receiving the heartbeat signal at the second node; and
   transmitting a message response from the second node to the first node in response to receiving the heartbeat signal, wherein the message response comprises a node identifier and a hop count value and the roundtrip time is associated with the hop count value in the lookup table.

2. The method of claim 1, further comprising:
   populating the lookup table with the roundtrip time;
   estimating one or more additional roundtrip times from the roundtrip time; and
   completing the lookup table with the one or more additional roundtrip times.

3. A computer implemented method for determining a size of a local peer group network, comprising:
   measuring a roundtrip time between a first node and a second node; and
   utilizing the measured roundtrip time to select the size of the local peer group network from a lookup table, wherein the computer performs one or more steps of measuring and utilizing;

when the roundtrip time exceeds the time interval of a heartbeat signal, adjusting the size of the local peer group network.

4. The method of claim 3, further comprising:
selecting a new size for the local peer group network from the lookup table by utilizing the roundtrip time that exceeds the time interval of the heartbeat signal.

5. The method of claim 3, further comprising:
decreasing a maximum allowable hop count value between the first node and the second node;
when the roundtrip time continues to exceed the time interval of the heartbeat signal, further decreasing the maximum allowable hop count value between the first node and the second node until the roundtrip time between the first node and the second node does not exceed the time interval of the heartbeat signal.

6. The method of claim 3, further comprising:
dividing a maximum allowable hop count value by a factor to establish a new maximum allowable hop count value between the first node and the second node;
when the roundtrip time continues to exceed the time interval of the heartbeat signal, further dividing the new maximum allowable hop count value by the factor until the roundtrip time between the first node and the second node does not exceed the time interval of the heartbeat signal.

7. A computer program product for determining a size of a local peer group network, comprising:
a storage device readable by a processor and storing instructions for execution by the processor for performing a method comprising:
measuring a roundtrip time between a first node and a second node;
utilizing the measured roundtrip time to select the size of the local peer group network from a lookup table, wherein the computer performs one or more steps of measuring and utilizing;
transmitting a heartbeat signal from the first node to the second node;
receiving the heartbeat signal at the second node; and
transmitting a message response from the second node to the first node in response to receiving the heartbeat signal, wherein the message response comprises a node identifier and a hop count value and the roundtrip time is associated with the hop count value in the lookup table.

8. The computer program product of claim 7, further comprising:
populating the lookup table with the roundtrip time;
estimating one or more additional roundtrip times from the roundtrip time; and
completing the lookup table with the one or more additional roundtrip times.

9. A computer program product for determining a size of a local peer group network, comprising:
a storage device readable by a processor and storing instructions for execution by the processor for performing a method comprising:
measuring a roundtrip time between a first node and a second node; and
utilizing the measured roundtrip time to select the size of the local peer group network from a lookup table, wherein the computer performs one or more steps of measuring and utilizing;
when the roundtrip time exceeds a time interval of a heartbeat signal, adjusting the size of the local peer group network.

10. The computer program product of claim 9, further comprising:
selecting a new size for the local peer group network from the lookup table by utilizing the roundtrip time that exceeds the time interval of the heartbeat signal.

11. The computer program product of claim 9, further comprising:
decreasing a maximum allowable hop count value between the first node and the second node;
when the roundtrip time continues to exceed the time interval of the heartbeat signal, further decreasing the maximum allowable hop count value between the first node and the second node until the roundtrip time between the first node and the second node does not exceed the time interval of the heartbeat signal.

12. The computer program product of claim 9, further comprising:
dividing a maximum allowable hop count value by a factor to establish a new maximum allowable hop count value between the first node and the second node;
when the roundtrip time continues to exceed the time interval of the heartbeat signal, further dividing the new maximum allowable hop count value by the factor until the roundtrip time between the first node and the second node does not exceed the time interval of the heartbeat signal.

13. A system for determining a size of a local peer group network, comprising:
a processor operable to measure a roundtrip time between a first node and a second node and utilize the measured roundtrip time to select the size of the local peer group network from a lookup table;
wherein the processor is further operable to transmit a heartbeat signal from the first node to the second node, receive the heartbeat signal at the second node, and transmit a message response from the second node to the first node in response to receiving the heartbeat signal, wherein the message response comprises a node identifier and a hop count value and the roundtrip time is associated with the hop count value in the lookup table.

14. The system of claim 13, wherein the processor is further operable to populate the lookup table with the roundtrip time estimate one or more additional roundtrip times from the roundtrip time, and complete the lookup table with the one or more additional roundtrip times.

15. A system for determining a size of a local peer group network, comprising:
a processor operable to measure a roundtrip time between a first node and a second node and utilize the measured roundtrip time to select the size of the local peer group network from a lookup table;
wherein the processor is further operable to determine when the roundtrip time exceeds a time interval of a heartbeat signal, and when the roundtrip time exceeds the time interval of the heartbeat signal adjust the size of the local peer group network.

16. The system of claim 15, wherein the processor is further operable to select a new size for the local peer group network from the lookup table by utilizing the roundtrip time that exceeds the time interval of the heartbeat signal.

17. The system of claim 15, wherein the processor is further operable to decrease a maximum allowable hop count value between the first node and the second node and
determine if the roundtrip time between the first node and the second node continues to exceed the time interval of the heartbeat signal, and when the roundtrip time continues to exceed the time interval of the heartbeat signal, further decrease the maximum allowable hop count value between the first node and the second node until the roundtrip time between the first node and the second node does not exceed the time interval of the heartbeat signal.

18. The system of claim 15, wherein the processor is further operable to divide a maximum allowable hop count value by a factor to establish a new maximum allowable hop count value between the first node and the second node, determine if the roundtrip time between the first node and the second node continues to exceed the time interval of the heartbeat signal, and if the roundtrip time continues to exceed the time interval of the heartbeat signal, further divide the new maximum allowable hop count value by the factor until the roundtrip time between the first node and the second node does not exceed the time interval of the heartbeat signal.

* * * * *